Aug. 13, 1935.  H. B. BRUEGGEMANN  2,011,469
WHEEL CHOCK
Filed May 7, 1935
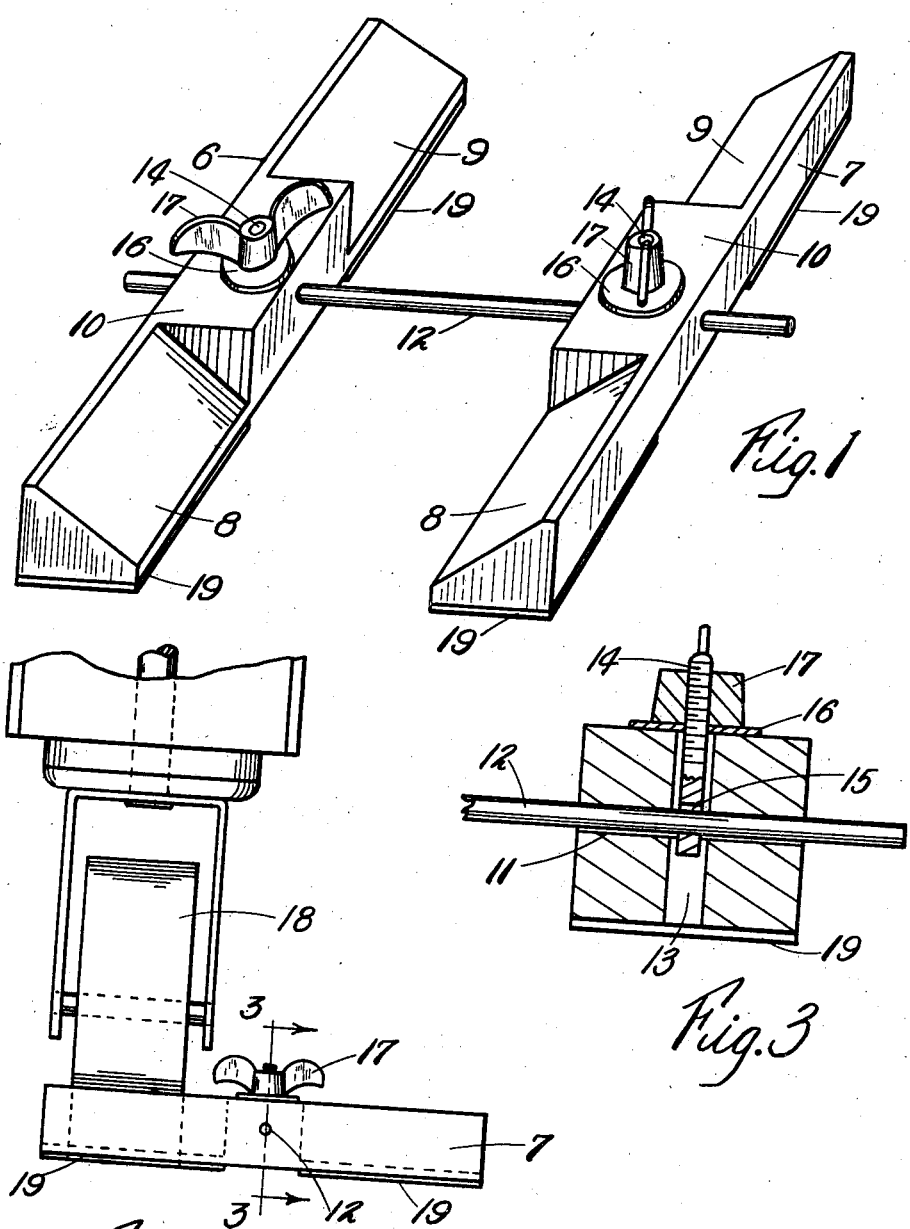
Inventor
Henry B. Brueggemann
By Murray and Zugelter
Attorneys Patented Aug. 13, 1935

2,011,469

UNITED STATES PATENT OFFICE 2,011,469

WHEEL CHOCK

Henry B. Brueggemann, St. Bernard, Ohio

Application May 7, 1935, Serial No. 20,219

5 Claims. (Cl. 188—32)

The present invention relates to a wheel chock to be used in preventing the clockwise or counter clockwise movement of a wheel under which it is positioned.

An object of the invention is to provide a simple, yet convenient, device for locking the wheels of factory trucks or the castors of washing machines and the like.

Another object of the invention is to provide a device which can be hung on, clamped or otherwise fastened to a truck or washing machine in a place where it will be easily reached and placed under the wheel of such truck or the like.

A further object is to provide a device which will entirely prevent forward and backward movement of a factory truck upon which it is employed thus providing a safe and practical means of loading factory trucks by saving time and possible injury to workmen during the loading or unloading operations.

In the drawing:

Fig. 1 is a perspective view of my wheel chock.

Fig. 2 illustrates the fashion in which the wheel chock engages a wheel.

Fig. 3 is a fragmental, cross sectional view taken on line 3—3 of Fig. 2 showing a method of adjusting the rod and block.

My invention consists of two rectangular blocks 6 and 7 which have inclined faces 8 and 9 milled or otherwise cut into their opposite ends. The end portions of the two blocks are, therefore, substantially wedge-shaped in cross section. A central portion 10 of the blocks retains the rectangular form of the original block and has a circular, transverse hole 11 (Fig. 3) through its center. The hole 11 receives a rod 12 which connects the two blocks and retains them in parallel relationship so that the faces of the blocks are oppositely inclined or converging.

Each block also has a vertical circular hole 13 which communicates with the transverse hole 11 and receives a threaded lug 14. The lower end of the lug contains a circular aperture 15 which registers with the transverse hole 11 and through which passes the rod 12. The upper threaded end of the lug is provided with a washer 16 and a wing nut 17. By this adjustable feature the blocks may be clamped in any desired spaced relationship, thus allowing the blocks to fit both large or small wheel peripheries.

The rod 12 is made of a spring metal material so that when the blocks are forced out of parallel relationship a corresponding force will be exerted by the rod to return the blocks to said parallel condition.

To position my device under a wheel of a small factory truck or under a castor 18 of a washing machine or the like, it is necessary first to loosen the wing nuts on the blocks and adjust the space between them, to a distance less than that required to allow the two faces on one side of the device to fit under a wheel. The wing nuts are then tightened and one end of the device compressed while the other end is placed under a wheel so that upon releasing the compressed end of the device, the spring rod 12 will urge the faces against the periphery of the wheel.

Frictional pads 19 made of rubber may be fastened to the bottom faces of the blocks to prevent possible motion of the wheel chock under extreme conditions.

I claim:

1. A wheel chock comprising two rectangular blocks having oppositely inclined, converging faces in their extremities, a rod connecting the blocks at their centers and yieldably urging the blocks to parallel spaced relationship, an adjustment means for the rod and block connections, and a friction means fastened on the bottom faces of the blocks, said rod being adapted to hold the two adjacent inclined faces of the blocks against a periphery of a wheel.

2. A wheel chock comprising two rectangular blocks having oppositely inclined converging faces in their extremities, a rod connecting the blocks at their centers and yieldably urging the blocks to parallel spaced relationship, and an adjustment means for the rod and block, said rod being adapted to hold the two adjacent, inclined faces of the blocks against a periphery of a wheel.

3. A wheel chock comprising two rectangular blocks having oppositely inclined converging faces in their extremities, a rod connecting the blocks at their centers and yieldably urging the blocks to parallel spaced relationship, said rod being adapted to hold the two adjacent inclined faces of the blocks against a periphery of a wheel.

4. A wheel chock comprising two rectangular blocks, a rod connecting the blocks at their centers and yieldably urging the blocks to parallel spaced relationship, said rod being adapted to hold two adjacent extremities of the blocks against a periphery of a wheel.

5. A wheel chock comprising two rectangular blocks having oppositely inclined converging faces in their extremities, a rod connecting the blocks and yieldably urging the blocks to parallel spaced relationship, said rod being adapted to hold two adjacent inclined faces of the blocks against a periphery of a wheel.

HENRY B. BRUEGGEMANN.